United States Patent
Salmon et al.

(10) Patent No.: US 6,634,840 B1
(45) Date of Patent: Oct. 21, 2003

(54) OBTURATOR FOR AN OPENING PRODUCED IN A METAL SHEET

(75) Inventors: Bertrand Salmon, Clichy la Garenne (FR); Gérard Le Blaye, Rosny/s/Bois (FR)

(73) Assignee: I.T.W. de France, Beauchamp (FR)

( * ) Notice: Subject to any disclaimer, the term of this patent is extended or adjusted under 35 U.S.C. 154(b) by 0 days.

(21) Appl. No.: 09/614,607

(22) Filed: Jul. 12, 2000

(30) Foreign Application Priority Data

Jul. 13, 1999 (FR) .............................. 99 09091

(51) Int. Cl.$^7$ ................................ F16B 13/06
(52) U.S. Cl. ......................... 411/44; 411/344
(58) Field of Search ................. 411/501, 502, 411/363, 360, 508, 520, 913, 176, 179, 22, 25, 23, 30, 48, 53, 41, 45, 46, 47, 344; 24/597, 298

(56) References Cited

U.S. PATENT DOCUMENTS

| | | | |
|---|---|---|---|
| 3,074,134 A | * | 1/1963 | Buechler |
| 3,717,324 A | | 2/1973 | Milde |
| 4,122,583 A | * | 10/1978 | Grittner et al. ............... 24/208 |
| 4,143,577 A | * | 3/1979 | Eberhardt ..................... 85/5 R |
| 4,312,614 A | * | 1/1982 | Palmer et al. ................. 411/44 |
| 5,028,187 A | * | 7/1991 | Sato ............................. 411/48 |
| 5,509,182 A | * | 4/1996 | Nakanishi ..................... 24/297 |
| 5,632,581 A | * | 5/1997 | Hasada ......................... 411/48 |
| 5,689,863 A | * | 11/1997 | Sinozaki ...................... 24/297 |
| 5,704,753 A | * | 1/1998 | Ueno ........................... 411/509 |
| 6,273,656 B1 | * | 8/2001 | Cleland et al. ............... 411/45 |

FOREIGN PATENT DOCUMENTS

| | | |
|---|---|---|
| DE | 1 475 075 | 5/1969 |
| DE | 39 02 500 A1 | 8/1990 |
| EP | 0 970 878 A1 | 1/2000 |
| GB | 2 085 540 A | 4/1982 |

* cited by examiner

Primary Examiner—Jerry Redman
(74) Attorney, Agent, or Firm—Lowe Hauptman Gilman & Berner LLP

(57) ABSTRACT

An obturator (1) for an opening has a collar (2) having a peripheral lip (3) adapted to come into abutment on a face of the opening. The obturator also has teeth (6) pivotally mounted on the collar (2) and a central portion forming a pusher (8) adapted to pivotally move the teeth (6) between an unlocked position and a locked position of the obturator (1), so that the teeth (6) come into an abutment on an opposite face of the opening in the locked position of the obturator (1).

23 Claims, 2 Drawing Sheets

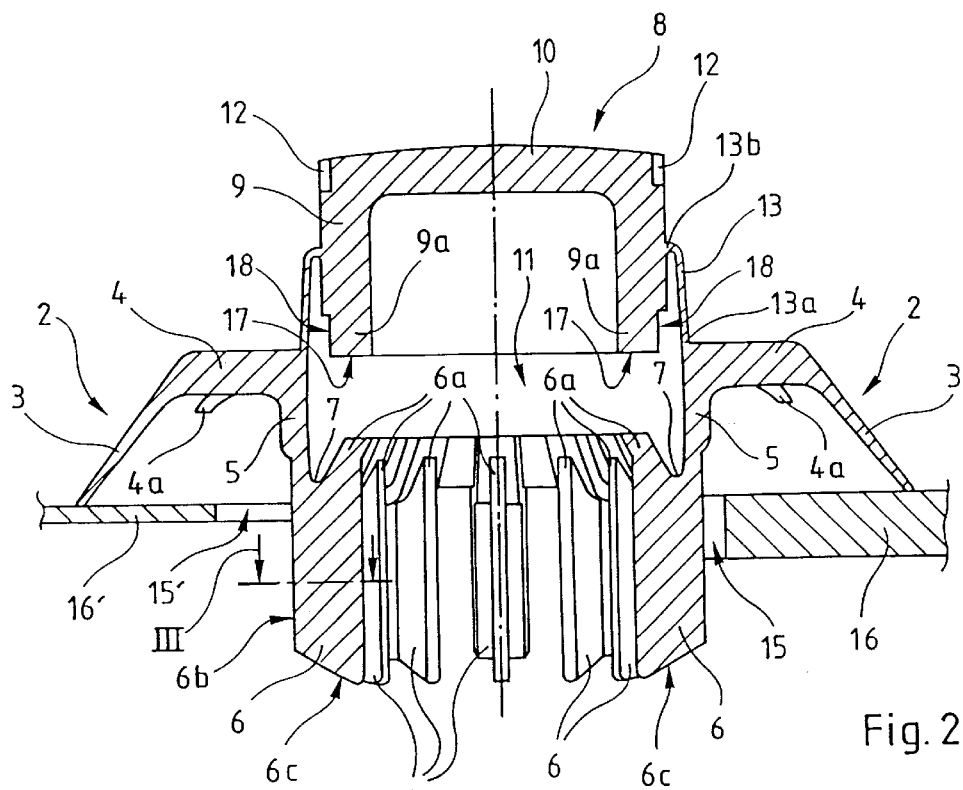
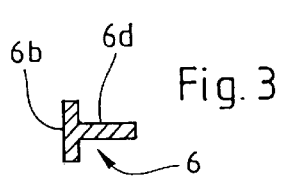
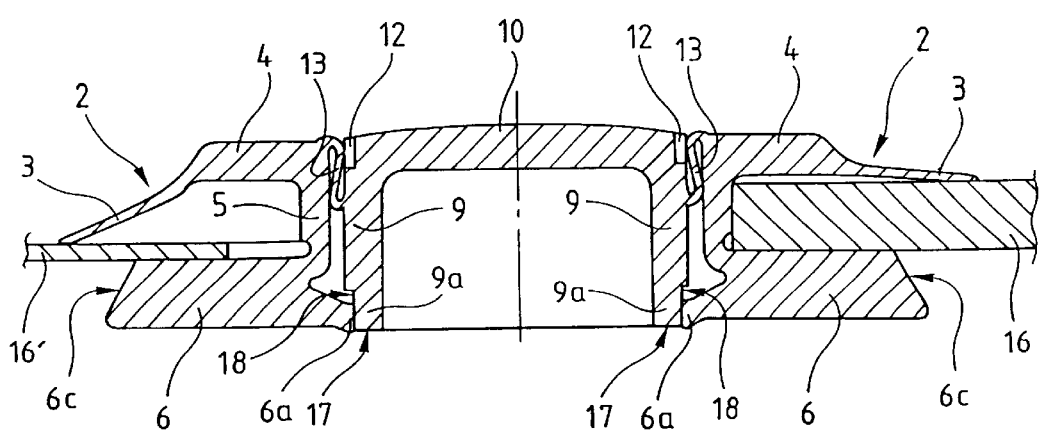

OBTURATOR FOR AN OPENING PRODUCED IN A METAL SHEET

FIELD OF THE INVENTION

The present invention concerns an obturator for an opening produced in a metal sheet and notably in a motor vehicle body.

BACKGROUND ART

Such obturators are used for sealingly closing openings produced in steel or aluminium structures.

These obturators are made from moulded plastics material and are generally fixed by snapping in. A peripheral lip is adapted to come into abutment sealingly on a face of the periphery of the opening to be closed off and snapping in lugs are elastically returned on the other face of the periphery

SUMMARY OF THE INVENTION

The aim of the present invention is to propose an obturator which is simple to fit and guarantees a good closing seal.

The obturator to which the invention relates comprises a collar having a peripheral lip adapted to come into abutment on one face of the opening.

In accordance with the invention, this obturator has at least one tooth pivotally mounted on the collar and a central portion forming a pusher, said central portion being adapted to pivotally move said at least one tooth between an unlocked position and a locked position of the obturator, said at least one tooth coming into abutment on an opposite face of the opening in the locked position of the obturator.

Thus the locking of the obturator is obtained by pivoting one or more teeth on the collar, during the movement of a central portion forming a pusher. This free pivoting movement of one or more teeth guarantees a more reliable fitting of the obturator than that obtained by elastic return of the snapping-in lugs or, in other systems, by the deformation of the obturator when it is locked in the opening.

In addition, by virtue of the locking obtained by pivoting of one or more teeth, this obturator can sealingly close openings of greater or lesser dimensions.

This is because it suffices for the edge of the opening to lie between the collar of the obturator supporting one or more teeth and the free end of this tooth or teeth.

According to a preferred characteristic of the invention, the central portion forming a pusher is adapted to maintain said at least one tooth pivoted in abutment on said opposite face of the opening in the locked position of the obturator.

The central portion thus fulfils both a role of pusher driving the pivoting of one or more teeth under the opening and of keeping these teeth in the locked position of the obturator.

According to another preferred characteristic of the invention, the central portion is joined to the collar by means of a deformable wall forming a travel limiter for the central portion between the unlocked position and the locked position of the obturator.

Thus the deformable wall makes it possible both to mount the central portion on the collar and to limit the movement thereof with respect to this collar.

According to another preferred characteristic of the invention, the central portion is able to move between a position projecting from the collar in the unlocked position of the obturator and a position retracted into the collar in said locked position of the obturator.

The central portion forming a pusher is thus easily accessible in order to be manoeuvred during the locking of the obturator and on the other hand does not form any interfering projection on the obturator placed in the opening.

Preferably, the collar comprises an orifice for guiding the central portion forming a pusher between the projecting position and the retracted position.

The movement of the central portion forming a pusher in the collar is facilitated by the guidance orifice.

Advantageously in this embodiment, the deformable wall, joining the central portion to the collar, is fixed by a first end to the collar and by a second end substantially half-way up the central portion forming a pusher.

Thus the deformable wall deforms inside the guidance orifice and jams the central portion in the guidance orifice in the locked position of the obturator.

In a practical fashion, the obturator comprises a series of teeth distributed over the collar, the teeth having an end flange extending towards the inside of the collar, substantially opposite the central portion forming a pusher in the unlocked position of the obturator.

This end flange cooperates with the central portion in order to pivotally move the teeth during the locking of the obturator.

According to an advantageous characteristic of the invention, the teeth comprise respectively at their free end, opposite to an end pivotally mounted on the collar, a sloping end wall adapted to cooperate with a contour of the opening when the obturator is introduced into the opening and to move the teeth towards the inside of the opening.

By virtue of the slope formed at the free end of the teeth, the latter can slightly retract towards the centre of the opening when the obturator is introduced into openings with smaller acceptable sizes.

Other particularities and advantages of the invention will also emerge from the following description.

BRIEF DESCRIPTION OF THE INVENTION

In the accompanying drawings given by way of non-limitative examples:

FIG. 2 is a view in longitudinal section of the obturator of FIG. 1, before it is locked in an opening;

FIG. 3 is a view in section along the line III-III of a detail of FIG. 2; and

FIG. 4 is a view similar to FIG. 2 of the obturator in a locked position in an opening.

DETAILED DESCRIPTION OF THE INVENTION

Figure 1:
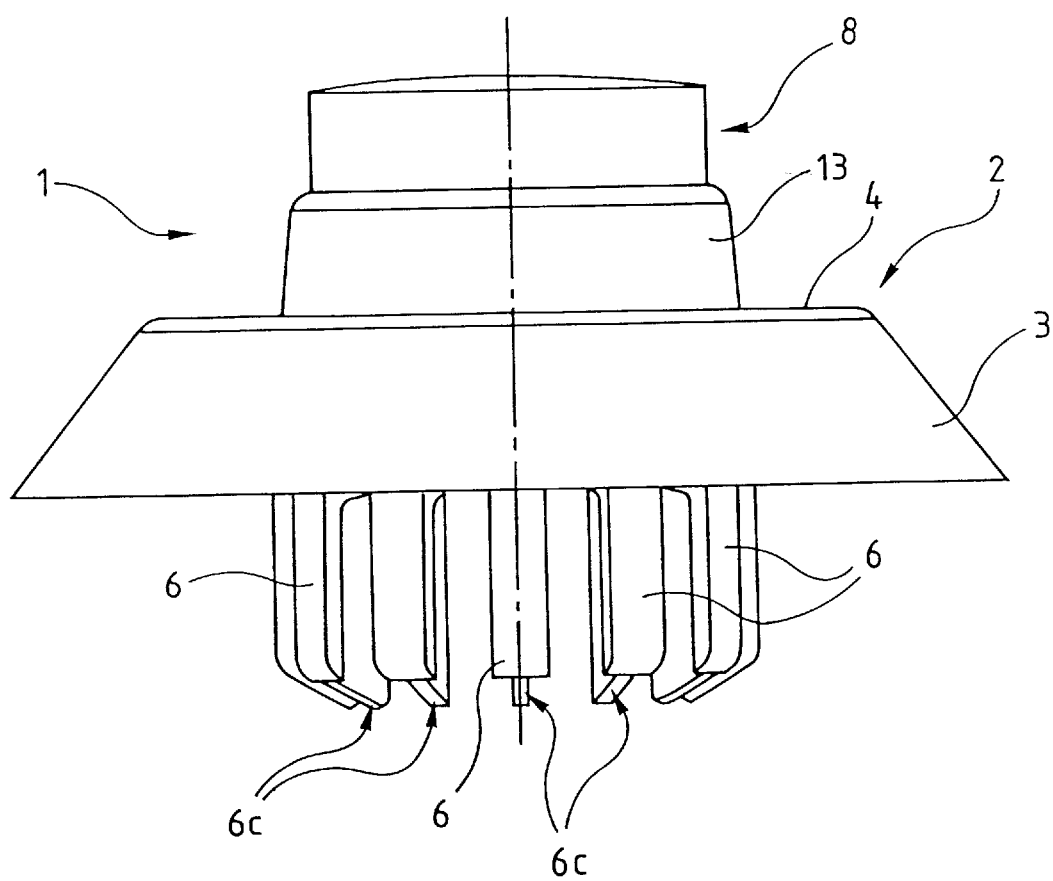
FIG. 1 is a view in elevation of an obturator according to one embodiment of the invention, in an unlocked position.

An obturator according to one embodiment of the invention will be described with reference first of all to FIG. 1.

This obturator makes it possible to close off openings, generally circular, produced in steel or aluminium plates, and notably in motor vehicle bodies.

This obturator 1 comprises a collar 2 which has a peripheral lip 3 adapted to come into abutment sealingly on one face of an opening.

This peripheral lip 3 is relatively thin and elastically deformable.

Here this peripheral lip 3 forms a frustoconical surface adapted to come into abutment on a contour of a circular opening. The collar 2 also has a thicker area; forming a circular ring 4 at the top of the peripheral lip 3.

This thicker area 4 is preferably stiffened by virtue of the presence of ribs 4a extending inside the collar 2.

As more clearly illustrated in FIG. 2, this circular ring 4 is extended, in this example, towards the centre of the obturator 1, by a relatively rigid cylindrical ring 5 which extends on the same side as the peripheral lip 3 from the circular ring 4.

The different components of this collar 2, that is to say the peripheral lip 3, the circular ring 4 and the cylindrical ring 5, are concentric.

The collar 2 also has a series of teeth 6.

In this example, the teeth 6 are distributed over the collar 2, and are mounted regularly on one end of the cylindrical ring 5, opposite to the circular ring 4. The obturator can thus have, by way of non-limitative example, twelve equidistant teeth.

Preferably each tooth 6 has an end flange 6a which forms an extension towards the inside of the collar 2, and more precisely inside the cylindrical ring 5 of this collar 2.

This end flange 6a thus forms a step close to the area of fixing the teeth 6 on the cylindrical ring 5 of the collar 2.

As illustrated in FIG. 3, each tooth 6 has a transverse section substantially in a T shape, the top 6b of this T shape extending substantially in line with the cylindrical ring 5 in the unlocked position of the obturator 1.

In addition, the teeth 6 each comprise at their free end, that is to say opposite to their end for mounting on the cylindrical ring 5, a sloping end wall 6c.

This end wall 6c thus forms an inclined plane whose lowest point, in the elevation view in FIG. 1, is situated towards the inside of the obturator 1, at the end of the leg 6d of the T shape of each tooth 6.

In accordance with the invention, each tooth 6 is pivotally mounted on the collar 2.

For this purpose, a hinge area 7 connects each tooth 6 to a cylindrical ring 5.

This hine area 7 corresponds in this example to a fixing of each tooth 6 to the cylindrical ring 5 solely at the top 6b of the T shape, the end flange forming a step 6a and the leg 6d of the T shape of each tooth being free with respect to the collar 2.

According to the invention, the obturator 1 also comprises, as illustrated in FIG. 1, a central portion 8 referred to in the remainder of the description as a pusher.

This pusher 8 has a cylindrical shape.

As illustrated in FIG. 2, it is formed by a cylindrical wall 9 closed at one end by a substantially plane wall 10 forming an abutment surface for moving the pusher.

The cylindrical ring 5 of the collar 2 and the pusher 8 are concentric, the cylindrical ring 5 thus defining a guide orifice 11 for the pusher 8. The cylindrical wall 9 of the pusher 8 has a free end 9a, opposite to the wall 10, which extends substantially opposite the end flanges 6a of the teeth 6 in the unlocked position of the obturator 1, as illustrated in FIG. 2.

In addition, the pusher 8 comprises, on its wall 10 forming an abutment surface, at least one notch 12, and in this example two diametrically opposed notches 12 which form a recess adapted to the passage of a tool allowing locking of the obturator, as will be explained below in the description of the functioning of this obturator.

The pusher 8 is joined to the collar 2 by virtue of a deformable wall 13.

As explained below, this deformable wall 13 forms a travel limiter during the movement of the pusher 8.

In this example, this deformable wall 13 consists of a cylindrical ring 13 made of deformable material, of fine thickness.

This deformable cylindrical ring 13 thus joins the collar 2 to the pusher 8.

As illustrated in FIG. 2, the deformable cylindrical ring 13 is fixed by a first end 13a to the collar 2 and by a second end 13b substantially half-way up the cylindrical pusher 8.

In this example, in the unlocked position of the obturator 1, this deformable cylindrical ring 13 is fixed in line with the cylindrical ring 5 of the collar 2.

This obturator 1 is preferably produced from plastics material, by moulding.

The functioning of such an obturator 1 will now be described with reference to FIGS. 2 and 4.

This obturator is adapted to sealingly close off the openings 15, 15', in this example circular, whose dimensions can lie within large diameter and thickness ranges.

Thus FIGS. 2 and 4 depict (half-view), by way of examples which are in no way limitative, a small-diameter opening 15 produced in a thick metal sheet 16 and a large-diameter opening 15' produced in a thin metal sheet 16'.

For example, the openings 15, 15' can have a diameter of between 18 and 25 mm and a thickness of between 0.75 and 3 mm.

As illustrated in FIG. 2, the obturator 1 is placed in the opening 15, 15' so that the teeth 6 pass through the opening 15, 15'.

By virtue of the sloping end wall 6c of the teeth 6, the latter can cooperate with the contour of the opening 15, 15' when the obturator I is introduced into the opening 2 so as to move the teeth 6 towards the inside of the opening 15, 15'.

The introduction of the obturator 1 is thus facilitated, even with small-diameter openings.

For larger openings, the obturator 1 is freely placed in them.

The introduction of the obturator continues until the peripheral lip 3 comes into abutment on one face of the opening 15, 15'.

The operator presses on the pusher 8, which projects on the collar 2 in the unlocked position of the obturator 1.

This pusher 8 thus moves in the guide orifice 11 formed by the rigid cylindrical ring 5 of the collar 2.

When the pusher moves, the peripheral lip 3 on the collar 2 firmly bears on the contour of the opening 15, 15' and has a tendency to press on the metal sheet 16, 16'.

As more clearly illustrated in FIG. 4, during the movement of the pusher 8, the deformable cylindrical ring 13 flexes towards the inside of the obturator 1 whilst coiling on itself.

By virtue of its fixing half-way up the pusher 8, it serves as guidance for the latter, in its thrust axis.

The end 9a of the pusher 8, and more precisely its circular end face 17, is adapted to pivotally move the teeth 6 between the unlocked position and the locked position of the obturator 1.

More precisely, the circular end face 17 of the pusher 8 pushes the end flanges 6a of the teeth 6.

The latter pivot about the hinge area 7 until they are situated in a horizontal position, perpendicular to the axis of movement of the pusher 8.

In this locked position, the teeth come in abutment on the opposite face of the opening 15, 15', below the peripheral lip 3 of the collar 2.

This contact between the teeth 6 and the opposite face of the opening 15, 15' is achieved at the head 6b of the T shape of each tooth 6, which procures a broad contact surface.

In the locked position of the obturator as illustrated in FIG. 4, the pusher 8 is adapted to keep the teeth 6 in abutment on this opposite face of the opening 15, 15'.

In practice, the teeth 6 are totally released from the guide orifice 11 in which the pusher 8 has fitted and the end flanges 6a of the teeth 6 come into abutment against the external face of the cylindrical wall 9 of the pusher 8.

In this example, this free abutment of the teeth 6 and pusher 8 is achieved at the end 9a of the cylindrical wall 9, in an annular groove 18 provided for this purpose.

The end. of travel of the pusher 8 is obtained by virtue of the deformable cylindrical ring 13 which limits the movement of the pusher 8.

The travel of the pusher 8 is sufficient to allow it to be retracted in the collar 2 in the locked position of the obturator.

Preferably, the abutment face 10 of the pusher lies flush in the plane formed by the circular ring 4 of the collar 2.

The deformable cylindrical ring 13 also forms a jamming element between the pusher 8 and the cylindrical ring 4 of the collar 2 which locks the pusher 8 in the locked position of the obturator.

When the pressure on,the obturator 1 is released, an elastic return effect is provided by the circular lip 3, which makes it possible to adjust the separation between the teeth 6 and the lip 3 to the thickness of the metal sheet 16, 16' in which the opening 15, 15' is provided.

In addition, because of the length of the teeth 6 which extend below the metal sheet 16, 16', a sealed closure can be obtained for openings with different diameters.

In this way an easily fitted obturator is obtained, for which perfect locking can be checked. visually by virtue of the fitting of the pusher 8 in a retracted position.

In addition, because of the possible adjustment of the distance separating the teeth 6 and peripheral lip 3, the obturator can be mounted sealingly on metal sheets 16, 16' punctured on the reverse, having cutout burrs in the direction of fitting, on the contour of the opening.

Removal of the obturator 1 with a suitable tool, such as a screwdriver, can be effected by virtue of the notches 12 visible on the top face of the pusher 8.

In practice, the tip of the tool is engaged in a notch 12 so as to once again cause the pusher 8 to project by means of a lever arm movement of the tool.

This lever movement can be repeated on each side of the pusher 8, in each notch 12.

When the pusher 8 returns to the initial position, projecting on the collar 2, the teeth 6, which are no longer held by the pusher 8, are elastically returned into their initial position, once again pivoting about the hinge area 7.

The obturator 1 can thus be removed and possibly reused.

What is claimed is:

1. An obturator for an opening produced in a sheet member having two opposite major faces communicated with each other by the opening, said obturator comprising:

a collar having an elastically deformable lip adapted to come into abutment with one of the major faces of the sheet member:

at least one tooth pivotally joined to said collar;

a central portion movable with respect to said lip, along an axial direction of said obturator, and between upper and lower axial positions to cause said at least one tooth to pivotally move between unlocked and locked positions of said obturator, respectively, said at least one tooth adapted to come into abutment with the opposite face of the sheet member in the locked position of said obturator; wherein when said central portion is in the upper axial position, a lower end face of said central portion is axially spaced from and is not in direct contact with an upper end face of said tooth, the upper end face of said tooth being located in an intermediate position on an axial path along which said central portion moves between the upper axial position and the lower axial position; and when said central portion is in the intermediate position, the lower end face of said central portion is in direct contact with the upper end face of said tooth, whereby a further movement of said central portion from the intermediate position towards the lower axial position will cause said tooth to pivotally move to the locked position of said obturator.

2. The obturator of claim 1, wherein said central portion has a lower end portion arranged substantially opposite an upper end portion of said at least one tooth in the unlocked position of said obturator whereby an axial movement of said central portion from the upper to lower axial positions causes the upper end portion of said at least one tooth to bear against the lower end portion of said central portion in the axial direction, and said at least one tooth to pivot to the locked position of said obturator; and in the locked position of said obturator, the upper end portion of said at least one tooth bears against the lower end portion of said central portion in a radial direction.

3. The obturator of claim 2, wherein the radial direction is substantially perpendicular to the axial direction.

4. The obturator of claim 2, wherein in the unlocked position of said obturator, the upper end portion of said at least one tooth is axially spaced from the lower end portion of said central portion.

5. The obturator of claim 2, wherein the lower end portion of said central portion is formed with a reduced thickness to define a flange serving as a stop to lock said at least one tooth in the locked position of said obturator.

6. The obturator of claim 1, wherein in the locked position of said obturator, said at least one tooth extends substantially perpendicular to the axial direction.

7. The obturator of claim 1, wherein said collar further comprises a ring member from which said lip extends obliquely and radially outwardly with respect to said central portion.

8. The obturator of claim 7, wherein said collar further comprises a tubular member extending downward from the ring member and spaced inwardly from said lip.

9. The obturator of claim 8, wherein said at least one tooth is hingedly joined to a lower end of the tubular member.

10. The obturator of claim 9, further comprising a flexible wall connecting said collar and said central portion together, said flexible wall is joined to said collar at an upper end of the tubular member.

11. The obturator of claim 7, wherein, in the locked position of said obturator, a top surface of said central portion is substantially flush with a top surface of said ring member.

12. The obturator of claim 1, wherein said at least one tooth has an outer portion joined to said collar, and an inner portion extending inwardly from the outer portion.

13. The obturator of claim 1, further comprising a deformable wall having a first end joined to an upper end portion of said collar and a second end joined to said central portion at a location about half way up said central portion.

14. The obturator of claim 1, wherein said collar defines therein an orifice for guiding said central portion between the upper and lower axial positions, said central portion projects from and is retracted into the orifice in the upper and lower axial positions, respectively.

15. The obturator of claim 1, wherein said at least one tooth comprises a series of teeth distributed circumferentially of said collar.

16. The obturator of claim 15, wherein each of said teeth has an outer portion hingedly joined to said collar, and an inner portion extending radially inwardly from the outer end portion.

17. The obturator of claim 15, wherein each of said teeth has a sloping wall at a lower end thereof for facilitating introduction of said teeth into the opening.

18. The obturator of claim 1, further comprising a deformable wall having first and second ends joined to said central portion and said collar, respectively, said deformable wall being flexible along substantially an entire length thereof between the first and second ends.

19. The obturator of claim 18, wherein said deformable wall assumes different shapes in said unlocked position and locked position of said obturator.

20. The obturator of claim 18, wherein said deformable wall has a substantially uniform thickness.

21. The obturator of claim 18, wherein said at least one tooth and said deformable wall are joined to said collar at two distinct and axially spaced locations.

22. The obturator of claim 18, wherein said deformable wall is located adjacent to and between said collar and said central portion when said obturator is in the locked position.

23. An obturator for an opening produced in a sheet member having two opposite major faces communicated with each other by the opening, said obturator comprising:

a collar having an elastically deformable lip adapted to come into abutment with one of the major faces of the sheet member;

at least one tooth pivotally joined to said collar;

a central portion movable with respect to said lip, along an axial direction of said obturator, and between upper and lower axial positions to cause said at least one tooth to pivotally move between unlocked and locked positions of said obturator, respectively, said at least one tooth adapted to come into abutment with the opposite face of the sheet member in the locked position of said obturator;

wherein said at least one tooth has an outer portion joined to said collar, and an inner portion extending inwardly from the outer portion; and said at least one tooth has a T-shaped cross-section with the inner portion extending from a middle region of the outer portion.

* * * * *